United States Patent
Xu et al.

(10) Patent No.: US 11,350,260 B2
(45) Date of Patent: May 31, 2022

(54) PUBLIC WARNING SYSTEM DUPLICATE MESSAGE DETECTION

(71) Applicant: Apple Inc., Cupertino, CA (US)

(72) Inventors: Fangli Xu, Beijing (CN); Haijing Hu, Beijing (CN); Dawei Zhang, Saratoga, CA (US); Yuqin Chen, Shenzhen (CN); Srirang A. Lovlekar, Cupertino, CA (US); Xu Ou, San Jose, CA (US); Sethuraman Gurumoorthy, San Jose, CA (US); Srinivasan Nimmala, San Jose, CA (US); Longda Xing, San Jose, CA (US); Sree Ram Kodali, Sunnyvale, CA (US); Murtaza A. Shikari, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 307 days.

(21) Appl. No.: 16/500,846

(22) PCT Filed: Aug. 7, 2018

(86) PCT No.: PCT/CN2018/099129
§ 371 (c)(1),
(2) Date: Oct. 4, 2019

(87) PCT Pub. No.: WO2020/029061
PCT Pub. Date: Feb. 13, 2020

(65) Prior Publication Data
US 2021/0368318 A1    Nov. 25, 2021

(51) Int. Cl.
*H04W 4/90* (2018.01)
*H04W 4/12* (2009.01)
*H04W 68/00* (2009.01)

(52) U.S. Cl.
CPC ............ *H04W 4/90* (2018.02); *H04W 4/12* (2013.01); *H04W 68/005* (2013.01)

(58) Field of Classification Search
CPC .......... H04W 4/06; H04W 4/90; H04W 8/08; H04W 68/00; H04W 68/005;
(Continued)

(56) References Cited

U.S. PATENT DOCUMENTS

| 2011/0034116 A1* | 2/2011 | Frederick | ............... A22B 5/161 |
|---|---|---|---|
|  |  |  | 452/132 |
| 2011/0159837 A1* | 6/2011 | Daly | ....................... H04L 67/28 |
|  |  |  | 455/404.1 |

(Continued)

*Primary Examiner* — Jean A Gelin
(74) *Attorney, Agent, or Firm* — Kowert, Hood, Munyon, Rankin & Goetzel, P.C.

(57) ABSTRACT

This disclosure relates to detecting duplicate public warning system messages in a cellular communication system. A wireless device may receive a public warning system indication from a cellular base station during a paging occasion. The public warning system indication may indicate that system information provided by the cellular base station includes a public warning system message. The wireless device may determine whether the public warning system message is a duplicate public warning system message. The wireless device may determine whether to decode the system information including the public warning system message based at least in part on whether the public warning system message is a duplicate public warning system message. The system information including the public warning system message may not be decoded if the public warning system message is determined to be a duplicate public warning system message.

20 Claims, 12 Drawing Sheets

(58) Field of Classification Search
CPC ... H04W 68/02; H04W 68/025; H04W 68/04; H04W 68/06; H04W 68/08; H04W 76/14; H04W 76/40; H04W 88/04
See application file for complete search history.

(56) References Cited

U.S. PATENT DOCUMENTS

| | | | |
|---|---|---|---|
| 2011/0171929 A1* | 7/2011 | Tamura | H04W 48/12 455/404.1 |
| 2012/0238208 A1* | 9/2012 | Bienas | H04W 8/24 455/41.2 |
| 2012/0281566 A1* | 11/2012 | Pelletier | H04W 76/27 370/252 |
| 2013/0246798 A1* | 9/2013 | Buckley | H04L 63/12 713/176 |
| 2014/0065998 A1* | 3/2014 | Dhomeja | H04W 4/06 455/404.1 |
| 2015/0087296 A1 | 3/2015 | Kim et al. | |
| 2015/0147958 A1 | 5/2015 | Wang et al. | |
| 2015/0244532 A1* | 8/2015 | Bi | H04L 63/0823 713/175 |
| 2015/0249952 A1* | 9/2015 | Lee | H04L 5/0073 370/312 |
| 2016/0234736 A1 | 8/2016 | Kubota et al. | |
| 2016/0373591 A1* | 12/2016 | Sharma | H04M 15/8072 |
| 2017/0215078 A1 | 7/2017 | Mochizuki et al. | |
| 2017/0311290 A1* | 10/2017 | Adjakple | H04W 76/18 |
| 2017/0373795 A1* | 12/2017 | Liu | H04J 11/005 |
| 2018/0352416 A1* | 12/2018 | Ryu | H04W 4/70 |
| 2020/0077253 A1* | 3/2020 | Kim | H04W 76/27 |

\* cited by examiner

| Bit | Short Message |
|---|---|
| 1 | systemInfoModification<br>If set to 1: indication of a BCCH modification other than SIB6, SIB7, SIB8 and SIB9. |
| 2 | etwasAndCmasModification<br>If set to 1: indication of an ETWS primary notification and/or an ETWS secondary notification and/or a CMAS notification. |
| 3 – [8] | Not used in this release of the specification, and shall be ignored by UE if received. |

FIG. 6

SIB6 Information Element

```
-- ASN1START

SIB6 ::=    SEQUENCE {
    messageIdentifier          BIT STRING (SIZE (16)),
    serialNumber               BIT STRING (SIZE (16)),
    warningType                OCTET STRING (SIZE (2)),
    ...,
    lateNonCriticalExtension   OCTET STRING                  OPTIONAL
}
-- TAG-SIB6-STOP
-- TAG-SIB6-START
```

FIG. 8

```
SIB7 Information Element
-- ASN1START
-- TAG-SIB7-START

SIB7 ::=    SEQUENCE {
    messageIdentifier              BIT STRING (SIZE (16)),
    serialNumber                   BIT STRING (SIZE (16)),
    warningMessageSegmentType      ENUMERATED {notLastSegment, lastSegment},
    warningMessageSegmentNumber    INTEGER (0..63),
    warningMessageSegment          OCTET STRING,
    dataCodingScheme               OCTET STRING (SIZE (1))    OPTIONAL,    -- Cond Segment1
    ...,
    lateNonCriticalExtension       OCTET STRING               OPTIONAL
}

-- TAG-SIB7-STOP
-- ASN1STOP
```

*FIG. 9*

SIB8 Information Element

```
-- ASN1START
-- TAG-SIB8-START

SIB8 ::=   SEQUENCE {
    messageIdentifier              BIT STRING (SIZE (16)),
    serialNumber                   BIT STRING (SIZE (16)),
    warningMessageSegmentType      ENUMERATED {notLastSegment, lastSegment},
    warningMessageSegmentNumber    INTEGER (0..63),
    warningMessageSegment          OCTET STRING,
    dataCodingScheme               OCTET STRING (SIZE (1))    OPTIONAL,  -- Cond Segment1
    ...,
    lateNonCriticalExtension       OCTET STRING               OPTIONAL
}

-- TAG-SIB8-STOP
-- ASN1STOP
```

FIG. 10

| Bit | Short message in paging DCI |
|---|---|
| 1 | systemInfoModification |
| 2 | etwsAndCmasIndication, i.e., PWS Notification |
| X | Valid period of etwsAndCmasIndication |
| [2+X]-8 | Not used in this release |

| Bit | Short message in paging DCI |
|---|---|
| 1 | systemInfoModification |
| 2 | etwsAndCmasIndication, i.e., PWS Notification |
| X | PWS message change indication |
| [2+X]-8 | Not used in this release |

PUBLIC WARNING SYSTEM DUPLICATE MESSAGE DETECTION

FIELD

The present application relates to wireless communications, and more particularly to systems, apparatuses, and methods for detecting duplicate public warning system messages in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements for wireless communications while allowing the UE device to maintain good transmit and receive abilities for improved communications. Accordingly, improvements in the field are desired.

SUMMARY

Embodiments are presented herein of apparatuses, systems, and methods for detecting duplicate public warning system messages in a cellular communication system.

According to the techniques described herein, a wireless device may be able to determine when a public warning system message being broadcast by a cellular base station has already been received by the wireless device before acquisition of the public warning system message has been performed, and so to determine whether to acquire the public warning system message.

A number of techniques may be possible for facilitating such early duplicate public warning system message detection. Among such techniques, use of an explicitly or implicitly indicated validity period for public warning system messages, use of a public warning system message change indications provided during paging occasions (e.g., in conjunction with public warning system message notifications), use of valuetag indications provided in system information scheduling information, and/or any of various other techniques may be possible.

By using such techniques, a wireless device may be able to determine not to decode a public warning system message if it is able to determine that the public warning system message is a duplicate of a message already received by the wireless device. Thus, the wireless device may be able to avoid unnecessary power consumption by the wireless device to acquire a duplicate message, without impacting the ability of the wireless device to reliably receive and present public warning system messages to a user of the wireless device.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 6 is a table including a portion defining a potential public warning system indication that could be used on a paging occasion, according to some embodiments;

FIGS. 8-10 illustrate possible system information block information elements that could be used in conjunction with public warning system message transmission techniques in a cellular communication system, according to some embodiments;

Figure 1:
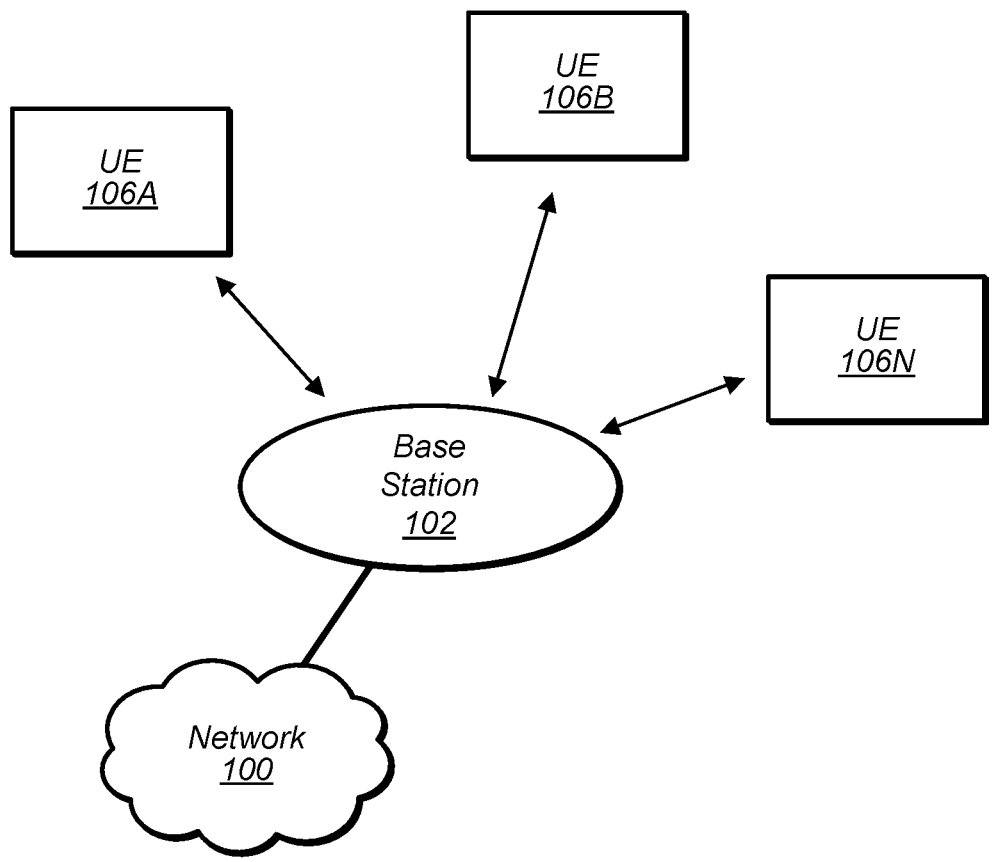
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
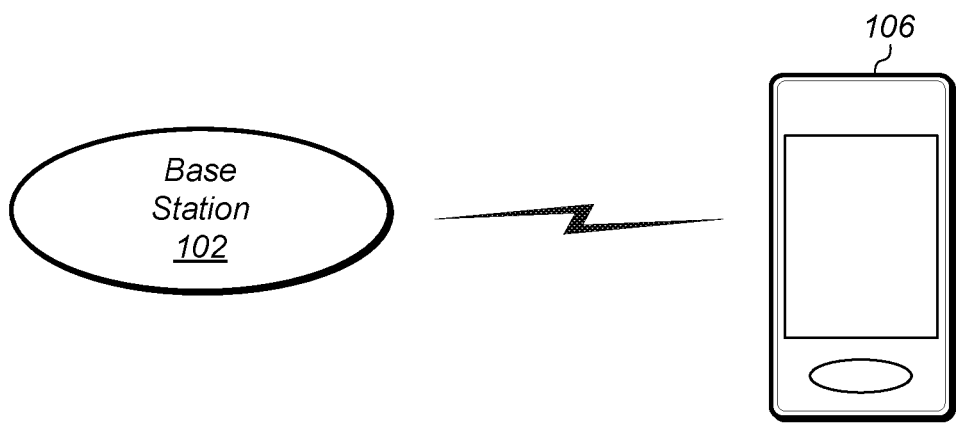
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform duplicate public warning system message detection in a cellular communication system such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
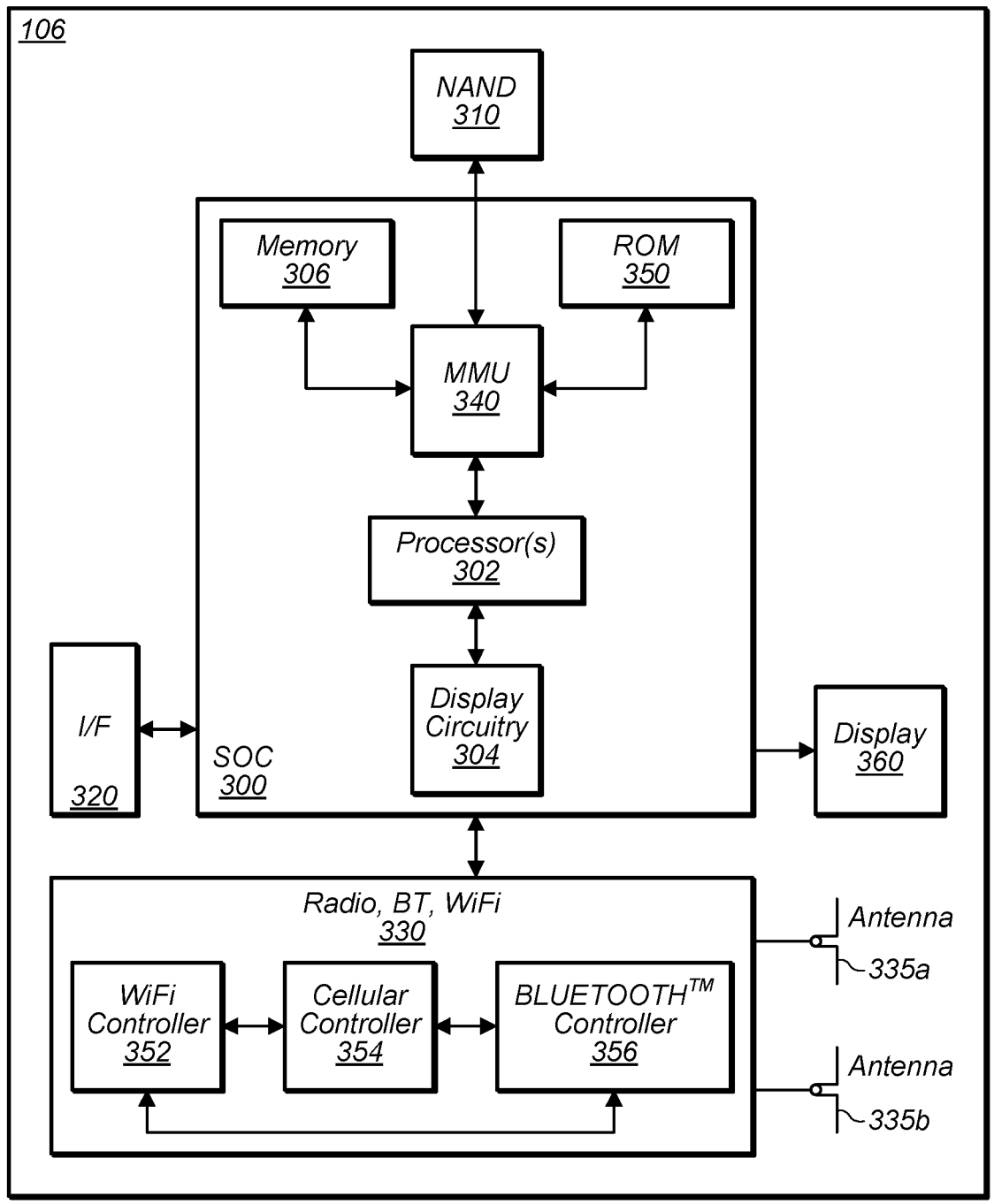
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform duplicate public warning system message detection in a cellular communication system such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform beam failure recovery using a contention based random access procedure according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
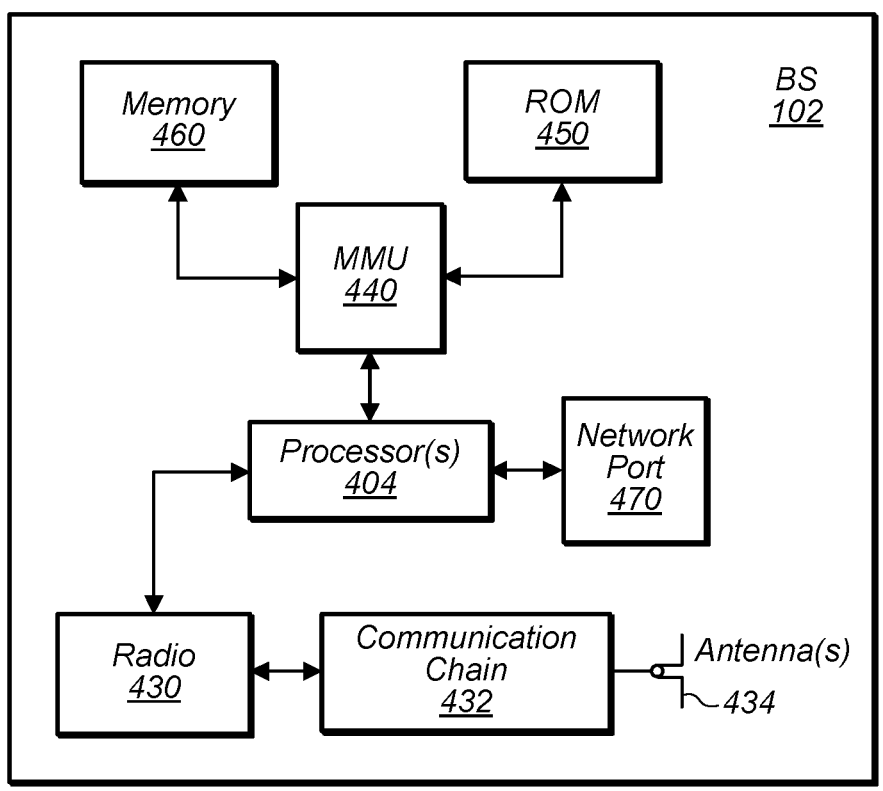
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for facilitating duplicate public warning system message detection in a cellular communication system.

Figure 5:
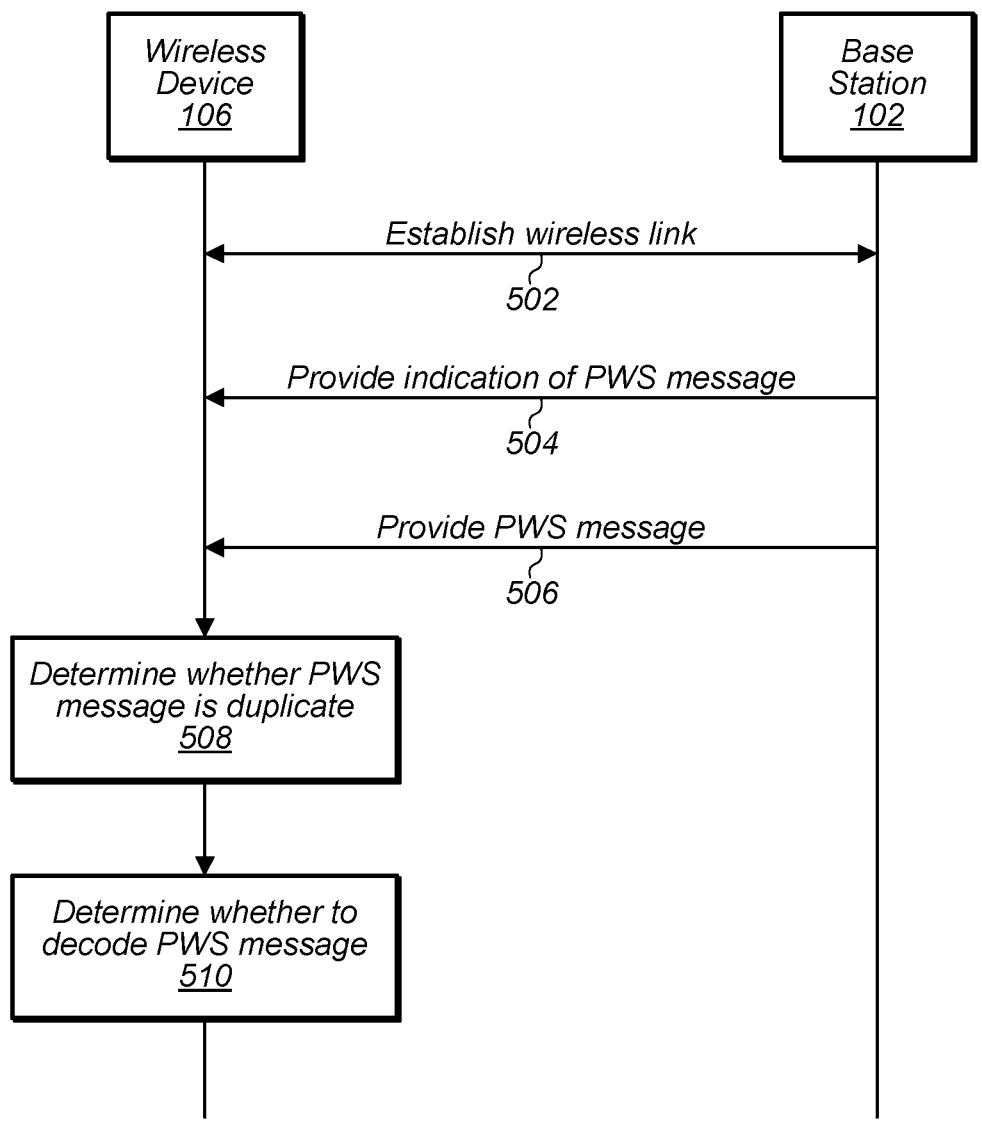
FIG. 5 is a communication flow diagram illustrating aspects of an exemplary possible method for detecting duplicate public warning system messages in a cellular communication system, according to some embodiments.

FIG. 5—Duplicate Public Warning System Message Detection

Several types of public warning system messages can be provided in conjunction with cellular communication systems. Examples may include Earthquake and Tsunami Warning System (ETWS) messages and Commercial Mobile Alert System (CMAS) messages, among various possibilities. In order to distribute such messages when they are provided to a cellular base station, the cellular base station may schedule and broadcast the messages as well as page wireless devices to provide indications that a warning message is being broadcast.

In many such instances, the cellular base station may broadcast the same content repeatedly for a relatively long time (e.g., 10 minutes, as one possibility), e.g., for reliability. As a result, a wireless device served by the cellular base station could acquire the broadcast system information containing the public warning system message(s) continuously until public warning system message notifications are not indicated in paging.

In some instances, duplication detection may be performed after acquiring such messages, e.g., to avoid providing the same message content to a user of a wireless device on multiple occasions. However, in such a case, the wireless device may have already acquired the message in order to determine that it is a duplicate, with corresponding unnecessary power consumption associated with the duplicate public message system acquisition.

Accordingly, it may be useful, at least in some instances, to provide techniques for facilitating duplicate public warning system message detection such that a wireless device may be able to avoid repeatedly receiving identical information, at least on some occasions. FIG. 5 is a communication flow diagram illustrating such a method for wireless devices (e.g., a cellular base station and a wireless user equipment (UE) device, as shown, as one possibility) to perform early duplicate public warning system message detection in a cellular communication system, according to some embodiments.

Aspects of the method of FIG. 5 may be implemented by a wireless device and a cellular base station, such as a UE 106 and a BS 102 illustrated in and described with respect to various of the Figures herein, or more generally in conjunction with any of the computer systems or devices shown in the above Figures, among other devices, as desired. Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device and the cellular base station may establish a wireless link. According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. The wireless device may also be capable of operating in a RRC idle or RRC inactive state while the wireless link is established, among various possibilities, e.g., at various times.

In 504, the cellular base station may provide an indication of a public warning system (PWS) message to the wireless device. The indication of the PWS message may be provided during a paging occasion, e.g., as part of paging downlink control information (DCI). The indication of the PWS message may indicate that system information provided by the cellular base station includes a PWS message.

In 506, the cellular base station may provide the PWS message to the wireless device. The PWS message may be broadcast, e.g., as part of system information provided by the cellular base station. According to some embodiments, there may be multiple types of PWS messages, potentially including ETWS messages (which may further include ETWS primary/short notifications and ETWS secondary/long notifications) and/or CMAS messages. The cellular base station may provide the PWS message in a system information block (SIB). Which SIB is used to provide the PWS message may depend on the PWS message type, in some instances. For example, in NR, 'SIB6' may be used for ETWS primary notifications, 'SIB7' may be used for ETWS secondary notifications, and 'SIB8' may be used for CMAS notifications, as one possibility. Other configurations are also possible.

The cellular base station may provide an indication for facilitating early detection by the wireless device of whether the PWS message is a duplicate PWS message. For example, the cellular base station may also provide a PWS message change indication during each paging occasion when a PWS message indication is provided, which may indicate whether a PWS message being broadcast by the cellular base station in system information has changed.

Such a PWS message change indication may be provided using any of a variety of possible formats. As one possibility, a 1 bit indicator that changes if any PWS message included in the system information provided by the cellular base station changes may be used. As another possibility, a multibit indicator that increments if any PWS message included in the system information provided by the cellular base station changes may be used. As still another possibility, a bitmap including a 1 bit indicator for each type of PWS message may be used, e.g., in which each respective 1 bit indicator changes if a PWS message type associated with the respective 1 bit indicator changes. As a still further possibility, a bitmap including a multibit indicator for each type of PWS message may be used, e.g., in which each respective multibit indicator increments if a PWS message type associated with the respective multibit indicator changes. Other types of PWS message change indications are also possible.

As another possibility, the cellular base station may provide an indication of whether the system information including the PWS message has changed using a valuetag associated with the PWS message that is provided in system information scheduling information. For example, in the system information scheduling information provided in SIB1, there may be a valuetag associated with each SIB (and thus potentially with each of multiple types of PWS messages). For each such valuetag, a value change may indicate that a PWS message of the PWS message type associated that valuetag has changed.

As a further possibility, the cellular base station may provide an indication of a validity period for a PWS message. The validity period for a PWS message may represent a period in which the cellular base station agrees not to change the PWS message. The validity period may be denominated in any of various ways. As one possibility, the validity period may include a number of paging cycles for which the PWS message will not be changed. As another possibility, the validity period may include a duration of time for which the PWS message will not be changed. As still another possibility, the validity period may be specified by providing an end time before which the PWS message will not be changed.

Similarly, the indication of the validity period may be provided in any of various ways. In some instances, the indication of the validity period for a PWS message may be provided with the PWS message itself, e.g., such that when the wireless device acquires the system information including the PWS message, the wireless device may be able to determine the validity period for the PWS message. In some instances, the indication of the validity period for a PWS message may be provided separately from the PWS message. For example, the indication of the validity period may be provided in the system information scheduling information, and/or with paging information during each paging occasion of the validity period of the PWS message. At least according to some embodiments, the indication of the validity period may be updated to reflect the remaining validity period over the course of the validity period. Alternatively, the full original validity period may be indicated whenever indicating the validity period, if desired, though this may lead to a wireless device determining that a validity period extends beyond its actual length, e.g., if the wireless device initially obtains an indication of the validity period after the validity period has already begun.

Note that validity period may be selected and specified by the cellular base station at any of various levels of granularity. For example, a validity period may be configured for all PWS messages, or a validity period may be configured for all PWS messages of each possible type of PWS message, or a validity period may be configured for each PWS message on an individual basis, among various possibilities.

Additionally or alternatively, the cellular base station and the wireless device may pre-agree on one or more transmission characteristics/parameters for PWS messages that can facilitate early detection by the wireless device of whether the PWS message is a duplicate PWS message. For example, the validity period for PWS messages (and possibly for each type of PWS message or at any other desired level of granularity) may be pre-agreed, e.g., based on agreements between network operators and wireless device vendors, and/or based on the specifications of a cellular standard according to which the cellular base station and the wireless device are communicating, among various possibilities.

In 508, the wireless device may determine whether the PWS message indicated by the PWS message indication is a duplicate PWS message, and in 510, the wireless device may determine to decode the PWS message. At least according to some embodiments, determining whether to decode the PWS message may be based at least in part on whether the PWS message is a duplicate PWS message. For example, if the PWS message is determined to be a duplicate PWS message, the wireless device may determine to not decode the PWS message, while if the PWS message is determined to not be a duplicate PWS message, or if the wireless device is unable to determine that the PWS message is a duplicate PWS message, the wireless device may determine to decode the PWS message, at least according to some embodiments.

The manner in which the wireless device determines whether the PWS message is a duplicate PWS message may depend on the mechanism used for facilitating early duplication detection for PWS messages. For example, if a validity period has been specified (e.g., by an explicit indication from the cellular base station via system information or paging information, or implicitly in accordance with a predefined PWS validity period value), the wireless device may determine whether the PWS message is received within a validity period of a previously received PWS message. In such a case, the PWS message may be determined to be a duplicate PWS message if the PWS message is received within the validity period of the previously received PWS message. The PWS message may be determined to not be a duplicate PWS message if the PWS message is received outside of the validity period of the previously received PWS message. If the PWS message is not a duplicate PWS message, the wireless device may further initiate a timer (or counter or other mechanism) to track the remaining validity period of the PWS message.

As another example, if the cellular base station provides PWS message change indications during paging occasions in conjunction with PWS message indications, the wireless device may receive and decode a PWS message change indication provided with the PWS indication. As such a PWS message change indication may indicate whether system information provided by the cellular base station includes a PWS message that has changed relative to when a most recent previous PWS indication was provided, the wireless device may be able to determine that the PWS message is a duplicate PWS message if the wireless device successfully received the previously provided paging information and if the PWS message change indication indicates that the PWS message has not changed since that paging occasion. Note that in such a scenario, it may be the case that the wireless device may not be able to determine whether the PWS message is a duplicate PWS message if the wireless device did not successfully decode paging information during the most recent previous paging occasion. Thus, in such a scenario, the wireless device may determine to proceed to decode the system information including the PWS message, e.g., based at least in part on being unable to determine whether the PWS message is a duplicate PWS message.

As still another example, if the cellular base station provides valuetags for SIBs including PWS messages with system information scheduling information (e.g., in SIB1), the wireless device may receive and decode a valuetag associated with the PWS message from the system information scheduling information. As such a PWS message valuetag may indicate whether system information provided by the cellular base station includes a PWS message that has changed relative to a most recent system information broadcast, the wireless device may be able to determine that the PWS message is a duplicate PWS message if the wireless device successfully received the previously provided system information scheduling information and if the PWS message valuetag indicates that the PWS message has not changed since that system information broadcast.

Thus, using such techniques as described herein, a wireless device may be able to determine whether a PWS message is a duplicate PWS message before decoding the PWS message, and may thus be able to avoid decoding at least some duplicate PWS messages. This may reduce the power consumption by the wireless device, which may in turn benefit overall battery life of the wireless device, potentially without compromising the ability of the wireless device to reliably acquire public warning system messages, at least according to some embodiments.

FIGS. 6-15—Additional Information

FIGS. 6-15 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

According to 5G NR, a cellular base station (e.g., gNB) may be responsible for scheduling and broadcasting of public warning system messages as well as for paging UEs served by the base station to provide an indication that the warning message is being broadcast.

Public warning systems could include any of multiple possible systems. For example, the Earthquake and Tsunami Warning System (ETWS) is a public warning system developed to meet the regulatory requirements for warning notifications related to earthquake and/or tsunami events. ETWS warning notifications can either be a primary notification (short notification) or secondary notification (providing detailed information). As another example, the Commercial Mobile Alert System (CMAS) is a public warning system developed for the delivery of multiple, concurrent warning notifications.

In order to detect such messages, a UE may monitor paging information provided by the base station for a ETWS/CMAS indication in its own paging occasion while operating in RRC_IDLE and RRC_INACTIVE. The UE may similarly monitor paging information provided by the base station for a ETWS/CMAS indication in any paging occasion when operating in RRC Connected. As an example, FIG. 6 is a table illustrating a possible paging information format in which a ETWS/CMAS indication can be included in paging information.

Paging information indicating a ETWS/CMAS notification may trigger acquisition of system information (e.g., without delaying until the next system information modification period) by the UE. The UE may keep monitoring and receiving the ETWS/CMAS SIB(s) until the UE receives paging information without a ETWS/CMAS notification indication.

Figure 7:
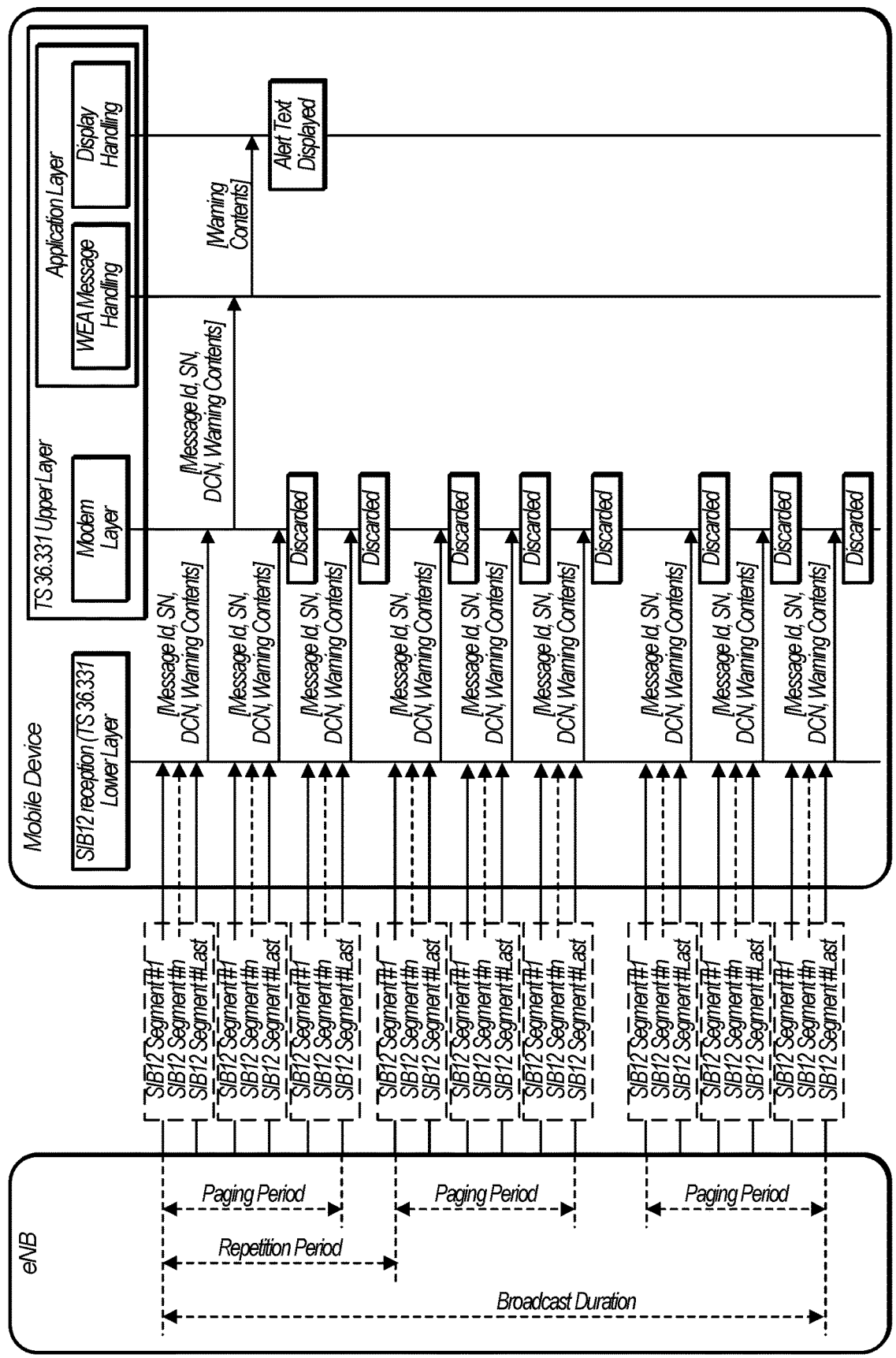
FIG. 7 is a communication flow diagram illustrating aspects of an exemplary possible public warning system message transmission, according to some embodiments.

FIG. 7 is a message flow diagram illustrating how such a process might occur in an exemplary LTE deployment scenario, in some instances. As shown, an eNB may provide multiple repetitions of a PWS message using SIB12 over a broadcast duration. During this time, a mobile device may receive ETWS/CMAS notification indications in multiple paging periods, resulting in the mobile device initially acquiring and presenting the PWS message, then subsequently acquiring and discarding the PWS message for the remainder of the broadcast duration.

Thus, in such a scenario, a UE may receive PWS SIBs repeatedly if a network broadcasts them repeatedly. Such SIBs could include any or all of SIB6, SIB7, and/or SIB8 in an example NR deployment scenario. FIGS. 8-10 illustrate such a possible SIB6 information element, SIB7 information element, and SIB8 information element, respectively, that could be used for such purposes, according to some embodiments. Note that other SIBs may also or alternatively be used for PWS messages; for example, as shown in the LTE deployment scenario illustrated in FIG. 7, SIB12 may be used for PWS messages in some instances.

For reliability, it may be possible for the network to broadcast the same content repeatedly for a substantial amount of time. The UE may keep acquiring the PWS SIBs until the network does not provide the CMAS/ETWS notification indication in paging. The UE may perform duplication detection at the RRC layer, e.g., based on message ID and serial number (SN) in the message content, and thus avoid presenting duplicate messages to a user of the UE, however, such duplication detection is only possible after the PWS SIBS have already been acquired. Thus, the UE may be consuming power unnecessarily to acquire duplicate system information. Accordingly, it may be desirable to avoid repeatedly receiving the same SIBs in the Uu interface, e.g., to reduce such unnecessary power consumption.

A UE may be able to accomplish such a reduction in acquisition of repeated PWS SIBs (and potentially a corresponding reduction in power consumption) by recognizing whether a PWS message for which a PWS notification is received has not changed relative to a PWS message already received by the UE, and avoiding acquiring the PWS message when it has not changed.

As one possible technique for providing a UE with the capability to determine whether a PWS message has changed, a validity period may be specified for each PWS message, e.g., such that a base station may not change a PWS message for the length of the validity period of the PWS message. The network may be able to configure the validity period for PWS messages provided by the network. The validity period can be configured to be the same for all PWS messages, or may be different for each PWS message, among various possibilities. The validity period can be defined by a number of multiples of a paging cycle used by the base station, or a time duration, or by a time at which the validity period will end, among various possibilities. Configuration of the validity period can be via broadcast (e.g., in SIB1), and/or via paging downlink control information (e.g., together with a PWS notification indication), and/or may be predefined (based on agreements between a network and wireless devices served by the network, and/or as specified by cellular communication standard specification documents). When a UE receives paging DCI including a PWS notification (and there is no validity period currently active for a previously received PWS notification), the UE may start a timer, counter, or other mechanism for tracking the (explicitly or implicitly) indicated valid period for the PWS message. While the timer/counter/etc. is running, once the UE has successfully received the whole PWS message, the UE will not acquire the same PWS message, at least according to some embodiments. After the timer/counter/etc. expires, if the UE receives a PWS notification, the UE will acquire the (likely non-duplicate) indicated PWS message and initiate a new timer/counter/etc. to track the validity period for that PWS message.

Figures 11, 12:
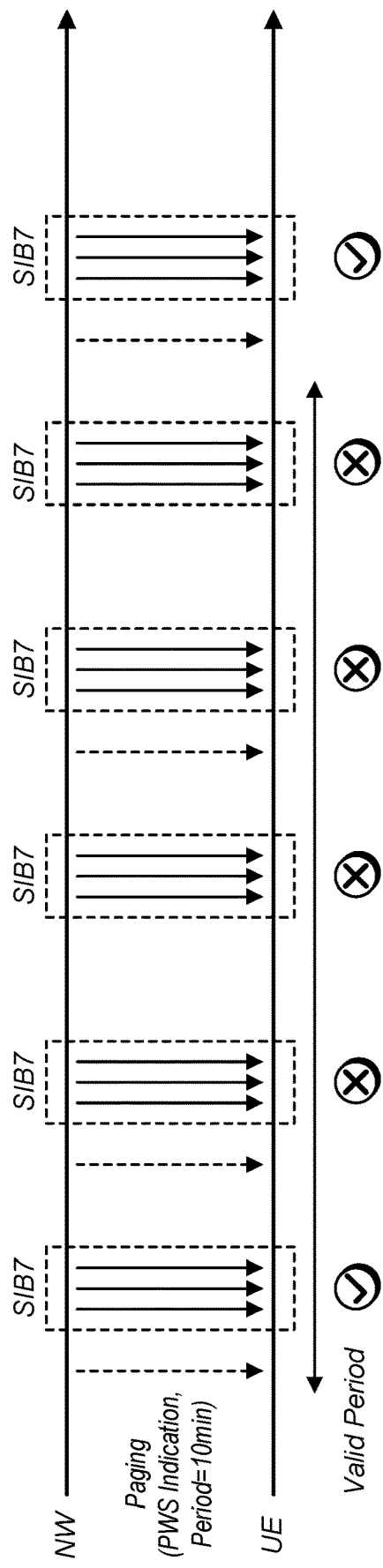
FIG. 11 illustrates a possible paging downlink control information message format that could be used to indicate a validity period for a public warning system message, according to some embodiments.
FIG. 12 is a communication flow diagram illustrating aspects of an exemplary possible public warning system message transmission scheme in which an indication of the validity period of a public warning system message is provided to facilitate duplicate public warning system message detection.

FIG. 11 is a table illustrating a possible paging information format in which a valid period indication can be included in paging information, e.g., in conjunction with a ETWS/CMAS indication, according to some embodiments. As shown, such an indication could be included using one or more of the bits indicated as reserved in the table illustrated in FIG. 6.

FIG. 12 is a communication flow diagram illustrating how a UE might handle repeated PWS message broadcasts when a validity period indication is used to facilitate duplicate PWS message detection, according to some embodiments. In the illustrated scenario, a PWS message is being provided by a network using SIB7 with a validity period of 10 minutes. As shown, the UE may acquire the PWS message from SIB7 based on initial receipt of a PWS message notification by the UE. The UE may not acquire the SIB7 for the remainder of the indicated validity period. After expiration of the validity period, if the network provides another PWS message notification, the UE may again acquire the SIB7, including any (potentially different) PWS message included in the SIB7.

As another possible technique for providing a UE with the capability to determine whether a PWS message has changed, a PWS message change indication could be provided in paging downlink control information. Such a PWS message change indication could be a 1 bit indicator or could include multiple bits. For example, a 1 bit indicator could be toggled if any PWS message changes. As another possibility, a multibit indicator could be used, such that if any PWS message changes, the change indication is incremented by 1.

As a further possibility, a bitmap of the PWS SIBs could be used as the PWS message change indication. For example, a 3 bit bitmap (e.g., including 1 bit per PWS SIB) could be used, with the rightmost/middle/leftmost bit providing the change indication of SIB6/SIB7/SIB8 respectively, such that if SIB6 changes, the rightmost bit would be toggled. As another example, a bitmap including multiple bits per PWS could be used, where if a PWS message changes, portion of the bitmap associated with that PWS message incremented by 1. Thus, in such a case, a bitmap 'aaabbbccc' could provide the change indication of SIB6/SIB7/SIB8, such that if SIB6 changes, 'aaa' could change from 001 to 010.

In such a case, when a UE receives paging information including a PWS notification, the UE may first check the change indication. If the change indication has changed from the previous paging occasion, the UE will acquire the corresponding PWS SIB, at least according to some embodiments. If the change indication has not changed from the previous paging occasion (and the UE has already successfully acquired the PWS message indicated by that previous PWS notification), the UE will not acquire the corresponding PWS SIB, at least according to some embodiments. If the UE enters the cell or the system information area for the first time (e.g., the previous state is out-of-service or the UE has just powered on), the UE may record the change indication and acquire the PWS SIBs. If the UE fails to decode paging, the UE may try to acquire the PWS message, and for the next time the UE receives paging with a PWS notification successfully, the UE may record the change indication and acquire the PWS SIBs.

Figures 13, 14:
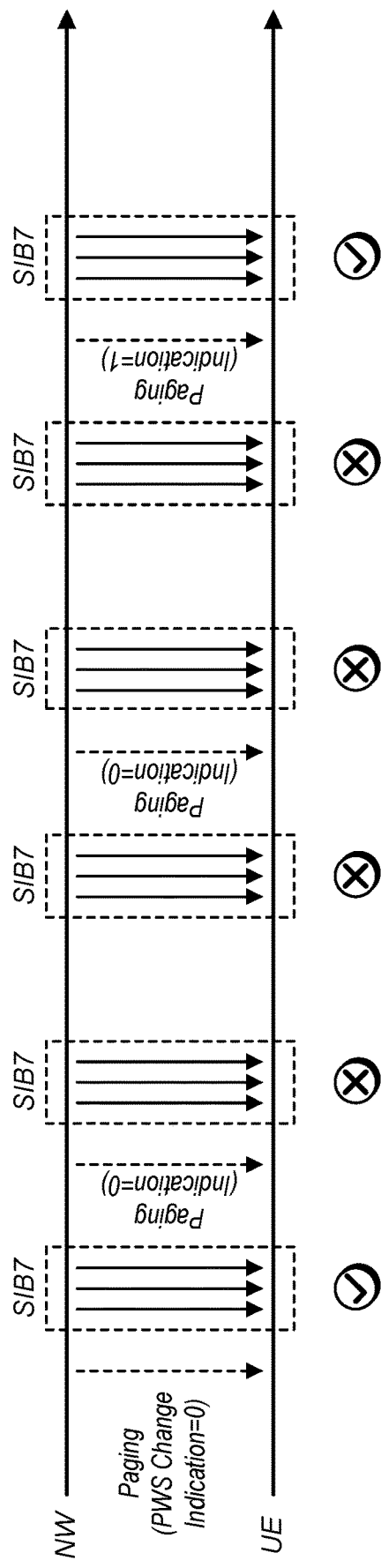
FIG. 13 illustrates a possible paging downlink control information message format that could be used to provide a public warning system message change indication, according to some embodiments.
FIG. 14 is a communication flow diagram illustrating aspects of an exemplary possible public warning system message transmission scheme in which a public warning system message change indication is provided during paging occasions to facilitate duplicate public warning system message detection.

FIG. 13 is a table illustrating a possible paging information format in which a PWS message change indication can be included in paging information, e.g., in conjunction with a ETWS/CMAS indication, according to some embodiments. As shown, such an indication could be included using one or more of the bits indicated as reserved in the table illustrated in FIG. 6.

FIG. 14 is a communication flow diagram illustrating how a UE might handle repeated PWS message broadcasts when a PWS message change indication is used to facilitate duplicate PWS message detection, according to some embodiments. In the illustrated scenario, a PWS message is being provided by a network using SIB7. As shown, the UE may acquire the PWS message from SIB7 based on initial receipt of a PWS message notification by the UE with a PWS change indication=0. The UE may not acquire the SIB7 for several subsequent paging occasions during which the PWS change indication remains equal to 0. However, when a PWS notification is subsequently received in which the PWS change indication=1, the UE may again acquire the SIB7, including any (potentially different) PWS message included in the SIB7.

As another possible technique for providing a UE with the capability to determine whether a PWS message has changed, a valuetag in SIB1 SI-SchedulingInfo may be configured to be applicable to PWS messages. Such a valuetag change can be used to indicate a content change for a corresponding PWS message. Since it may be possible for the PWS messages to be changed in the middle of a system information modification period, it may also be possible for such a valuetag to be changed in the middle of a system information modification period.

In such a scenario, when a UE receives paging information including a PWS notification, the UE may first acquire the SIB1 and check the valuetag(s) for the PWS SIBs. If one or more of these valuetags have changed, the UE will acquire the corresponding PWS SIB, at least according to some embodiments. Otherwise (e.g., if no valuetag associated with a PWS SIB has changed), the UE may not acquire the PWS SIBs.

Figure 15:
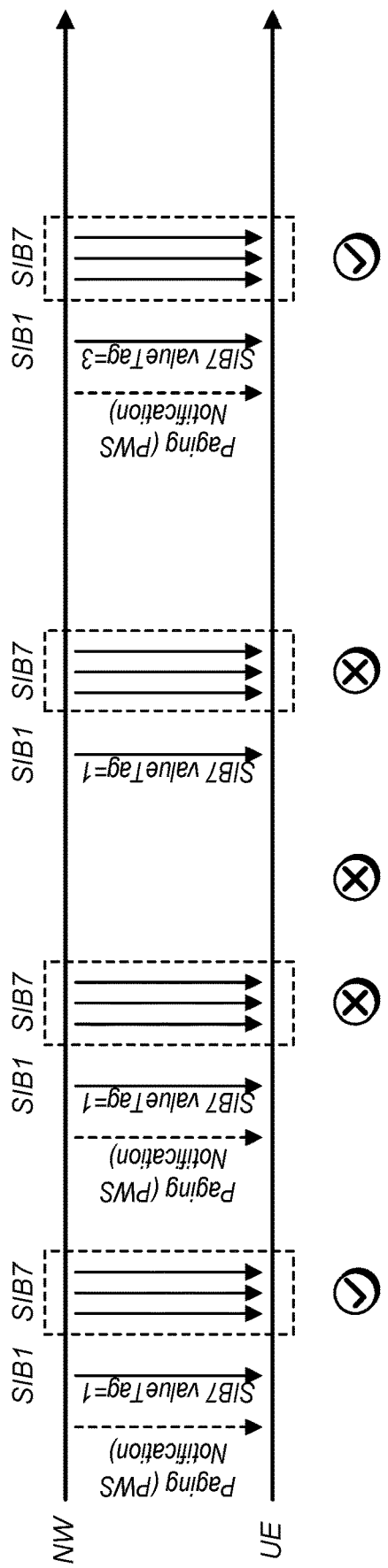
FIG. 15 is a communication flow diagram illustrating aspects of an exemplary possible public warning system message transmission scheme in which a public warning system message valuetag is provided in system information to facilitate duplicate public warning system message detection.

FIG. 15 is a communication flow diagram illustrating how a UE might handle repeated PWS message broadcasts when a SIB1 valuetag based indication is used to facilitate duplicate PWS message detection, according to some embodiments. In the illustrated scenario, a PWS message is being provided by a network using SIB7. As shown, the UE may acquire the PWS message from SIB7 based on initial receipt of a PWS message notification by the UE and acquisition of SIB1 with a SIB7 valuetag=1. The UE may not acquire the SIB7 for several subsequent paging occasions during which the SIB7 valuetag remains equal to 1. However, when a PWS notification is subsequently received and the SIB7 valuetag acquired from SIB1 indicates a value of 3, the UE may again acquire the SIB7, including any (potentially different) PWS message included in the SIB7.

As previously noted, such techniques for facilitating duplicate PWS message detection may help reduce UE power consumption, as when the network broadcasts the same PWS message for a long time, a UE may be able to limit the number of times it acquires the repeated PWS message, at least according to some embodiments.

In the following further exemplary embodiments are provided.

One set of embodiments may include an apparatus, comprising a processing element configured to cause a cellular base station to: provide a public warning system (PWS) indication during a paging occasion, wherein the PWS indication indicates that system information provided by the cellular base station comprises a PWS message; provide the system information comprising the PWS message; and provide an indication of whether the system information comprising the PWS message has changed, wherein the indication of whether the system information comprising the PWS message has changed is separate from the system information comprising the PWS message.

According to some embodiments, the processing element is further configured to cause the cellular base station to: wherein the indication of whether the system information comprising the PWS message has changed comprises a PWS message change indication provided during the paging occasion.

According to some embodiments, the PWS message change indication comprises a 1 bit indicator that changes if any PWS message comprised in the system information changes.

According to some embodiments, the PWS message change indication comprises a multibit indicator that increments if any PWS message comprised in the system information changes.

According to some embodiments, the PWS message change indication comprises a bitmap comprising a 1 bit indicator for each type of PWS message, wherein each respective 1 bit indicator changes if a PWS message type associated with the respective 1 bit indicator changes.

According to some embodiments, the PWS message change indication comprises a bitmap comprising a multibit indicator for each type of PWS message, wherein each respective multibit indicator increments if a PWS message type associated with the respective multibit indicator changes.

According to some embodiments, the indication of whether the system information comprising the PWS message has changed comprises a valuetag associated with the PWS message provided in system information scheduling information.

According to some embodiments, the system information scheduling information comprises a valuetag for each of a plurality of types of PWS messages, wherein for each respective valuetag, a value change indicates that a PWS message of a PWS message type associated with the respective valuetag has changed.

Another set of embodiments may include a cellular base station, comprising: an antenna; a radio operably coupled to the antenna; and a processing element operably coupled to the radio; wherein the cellular base station is configured to: provide an indication of a validity period of a public warning system (PWS) message; provide a PWS indication during each paging occasion of the validity period of the PWS message, wherein the PWS indication indicates that system information provided by the cellular base station comprises a PWS message; and provide a plurality of repetitions of the system information comprising the PWS message during the validity period of the PWS message, wherein the system information comprising the PWS message is not changed for the duration of the validity period of the PWS message.

According to some embodiments, the indication of the validity period of the PWS message is provided separately from the system information comprising the PWS message.

According to some embodiments, the indication of the validity period of the PWS message is provided in system information scheduling information.

According to some embodiments, the indication of the validity period of the PWS message is provided during each paging occasion of the validity period of the PWS message.

According to some embodiments, the indication of the validity period of the PWS message comprises one of: an indication of a validity period for all types of PWS messages; an indication of a validity period specific to a PWS message type of the PWS message; or an indication of a validity period specific to the PWS message.

According to some embodiments, the validity period of the PWS message comprises one of: a number of paging cycles for which the PWS message will not be changed; a duration of time for which the PWS message will not be changed; or an end time before which the PWS message will not be changed.

Yet another set of embodiments may include a wireless device, comprising: an antenna; a radio operably coupled to the antenna; and a processing element operably coupled to the radio; wherein the wireless device is configured to: establish a cellular link with a cellular base station; receive a public warning system (PWS) indication from the cellular base station during a paging occasion, wherein the PWS indication indicates that system information provided by the cellular base station comprises a PWS message; determine whether the PWS message is a duplicate PWS message; and determine whether to decode the system information comprising the PWS message based at least in part on whether the PWS message is a duplicate PWS message, wherein the system information comprising the PWS message is not decoded if the PWS message is determined to be a duplicate PWS message.

According to some embodiments, to determine whether the PWS message is a duplicate PWS message, the wireless device is further configured to: determine whether the PWS message is received within a validity period of a previously received PWS message, wherein the PWS message is determined to be a duplicate PWS message if the PWS message is received within the validity period of the previously received PWS message, wherein the PWS message is determined to not be a duplicate PWS message if the PWS message is received outside of the validity period of the previously received PWS message.

According to some embodiments, the wireless device is further configured to: determine the validity period of the previously received PWS message based at least in part on one or more of: system information broadcast by the cellular base station; paging information provided with a PWS indication associated with the previously received PWS message; or a predefined PWS validity period value.

According to some embodiments, to determine whether the PWS message is a duplicate PWS message, the wireless device is further configured to: receive and decode a PWS message change indication provided with the PWS indication, wherein the PWS message change indication indicates whether the system information provided by the cellular base station comprises a PWS message that has changed relative to when a most recent previous PWS indication was provided.

According to some embodiments, the wireless device is further configured to: determine that the wireless device did not successfully decode paging information during a most recent previous paging occasion; determine that the wireless device is unable to determine whether the PWS message is a duplicate PWS message based at least in part on not successfully decoding paging information during the most recent previous paging occasion; and determine to decode the system information comprising the PWS message based at least in part on being unable to determine whether the PWS message is a duplicate PWS message.

According to some embodiments, to determine whether the PWS message is a duplicate PWS message, the wireless device is further configured to: receive and decode a PWS message valuetag provided in a different portion of the system information than a portion of the system information comprising the PWS message, wherein the PWS message valuetag indicates whether the system information provided by the cellular base station comprises a PWS message that has changed relative to when a most recent previous system information broadcast.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
an antenna;
a radio operably coupled to the antenna; and
a processing element operably coupled to the radio;
wherein the wireless device is configured to:
  receive a public warning system (PWS) indication from a cellular base station during a paging occasion, wherein the PWS indication indicates that system information provided by the cellular base station comprises a PWS message;
  determine whether the PWS message is a duplicate PWS message, wherein to determine whether the PWS message is a duplicate PWS message, the wireless device is further configured to:
    determine whether the PWS message is received within a validity period of a previously received PWS message,
    wherein the PWS message is determined to be a duplicate PWS message if the PWS message is received within the validity period of the previously received PWS message,
    wherein the PWS message is determined to not be a duplicate PWS message if the PWS message is received outside of the validity period of the previously received PWS message; and
  determine whether to decode the system information comprising the PWS message based at least in part on whether the PWS message is a duplicate PWS message, wherein the system information comprising the PWS message is not decoded if the PWS message is determined to be a duplicate PWS message.

2. The wireless device of claim 1, wherein the wireless device is further configured to:
 determine the validity period of the previously received PWS message based at least in part on one or more of:
  system information broadcast by the cellular base station;
  paging information provided with a PWS indication associated with the previously received PWS message; or
  a predefined PWS validity period value.

3. The wireless device of claim 1, wherein the wireless device is further configured to:
 determine that the wireless device did not successfully decode paging information during a most recent previous paging occasion;
 determine that the wireless device is unable to determine whether the PWS message is a duplicate PWS message based at least in part on not successfully decoding paging information during the most recent previous paging occasion; and
 determine to decode the system information comprising the PWS message based at least in part on being unable to determine whether the PWS message is a duplicate PWS message.

4. The wireless device of claim 1, wherein the validity period of the PWS message is determined based on one of:
 an indication of a validity period for all types of PWS messages;
 an indication of a validity period specific to a PWS message type of the PWS message; or
 an indication of a validity period specific to the PWS message.

5. The wireless device of claim 1, wherein the validity period of the PWS message comprises one of:
 a number of paging cycles for which the PWS message will not be changed;
 a duration of time for which the PWS message will not be changed; or
 an end time before which the PWS message will not be changed.

6. The wireless device of claim 1, wherein the wireless device is further configured to:
 receive an indication of the validity period of the previously received PWS message from the cellular base station.

7. The wireless device of claim 6,
 wherein the indication of the validity period of the previously received PWS message is provided separately from the system information comprising the PWS message.

8. The wireless device of claim 6, wherein the indication of the validity period of the previously received PWS message is provided in system information scheduling information provided in a system information block broadcast by the cellular base station.

9. The wireless device of claim 6, wherein the indication of the validity period of the previously received PWS message is provided in paging information provided during each paging occasion of the validity period of the previously received PWS message.

10. An apparatus, comprising:
 a processing element configured to cause a wireless device to:
  receive a public warning system (PWS) indication from a cellular base station during a paging occasion, wherein the PWS indication indicates that system information provided by the cellular base station comprises a PWS message;
  determine whether the PWS message is a duplicate PWS message, wherein to determine whether the PWS message is a duplicate PWS message, the processing element is further configured to cause the wireless device to:
   determine whether the PWS message is received within a validity period of a previously received PWS message,
   wherein the PWS message is determined to be a duplicate PWS message if the PWS message is received within the validity period of the previously received PWS message,
   wherein the PWS message is determined to not be a duplicate PWS message if the PWS message is received outside of the validity period of the previously received PWS message; and
  determine whether to decode the system information comprising the PWS message based at least in part on whether the PWS message is a duplicate PWS message, wherein the system information comprising the PWS message is not decoded if the PWS message is determined to be a duplicate PWS message.

11. The apparatus of claim 10, wherein the processing element is further configured to cause the wireless device to:
 determine the validity period of the previously received PWS message based at least in part on one or more of:
  system information broadcast by the cellular base station;
  paging information provided with a PWS indication associated with the previously received PWS message; or
  a predefined PWS validity period value.

12. The apparatus of claim 10, wherein the processing element is further configured to cause the wireless device to:
 determine that the wireless device did not successfully decode paging information during a most recent previous paging occasion;
 determine that the wireless device is unable to determine whether the PWS message is a duplicate PWS message based at least in part on not successfully decoding paging information during the most recent previous paging occasion; and
 determine to decode the system information comprising the PWS message based at least in part on being unable to determine whether the PWS message is a duplicate PWS message.

13. The apparatus of claim 10, wherein the validity period of the PWS message is determined based on one of:
 an indication of a validity period for all types of PWS messages;
 an indication of a validity period specific to a PWS message type of the PWS message; or
 an indication of a validity period specific to the PWS message.

14. The apparatus of claim 10, wherein the validity period of the PWS message comprises one of:
 a number of paging cycles for which the PWS message will not be changed;
 a duration of time for which the PWS message will not be changed; or
 an end time before which the PWS message will not be changed.

15. The apparatus of claim 10, wherein the processing element is further configured to cause the wireless device to:

receive an indication of the validity period of the previously received PWS message from the cellular base station,
wherein the indication of the validity period of the previously received PWS message is either:
    provided separately from the system information comprising the PWS message;
    provided in system information scheduling information provided in a system information block broadcast by the cellular base station; or
    provided in paging information provided during each paging occasion of the validity period of the previously received PWS message.

16. A method, comprising:
by a wireless device:
    receiving a public warning system (PWS) indication from a cellular base station during a paging occasion, wherein the PWS indication indicates that system information provided by the cellular base station comprises a PWS message;
    determining whether the PWS message is a duplicate PWS message, wherein to determine whether the PWS message is a duplicate PWS message, the method further comprises:
        determining whether the PWS message is received within a validity period of a previously received PWS message,
        wherein the PWS message is determined to be a duplicate PWS message if the PWS message is received within the validity period of the previously received PWS message,
        wherein the PWS message is determined to not be a duplicate PWS message if the PWS message is received outside of the validity period of the previously received PWS message; and
    determining whether to decode the system information comprising the PWS message based at least in part on whether the PWS message is a duplicate PWS message, wherein the system information comprising the PWS message is not decoded if the PWS message is determined to be a duplicate PWS message.

17. The method of claim 16, the method further comprising:
    determining the validity period of the previously received PWS message based at least in part on one or more of:
    system information broadcast by the cellular base station;
    paging information provided with a PWS indication associated with the previously received PWS message; or
    a predefined PWS validity period value.

18. The method of claim 16, the method further comprising:
    determining that the wireless device did not successfully decode paging information during a most recent previous paging occasion;
    determining that the wireless device is unable to determine whether the PWS message is a duplicate PWS message based at least in part on not successfully decoding paging information during the most recent previous paging occasion; and
    determining to decode the system information comprising the PWS message based at least in part on being unable to determine whether the PWS message is a duplicate PWS message.

19. The method of claim 16,
wherein the validity period of the PWS message is determined based on one of:
    an indication of a validity period for all types of PWS messages;
    an indication of a validity period specific to a PWS message type of the PWS message; or
    an indication of a validity period specific to the PWS message; and
wherein the validity period of the PWS message comprises one of:
    a number of paging cycles for which the PWS message will not be changed;
    a duration of time for which the PWS message will not be changed; or
    an end time before which the PWS message will not be changed.

20. The method of claim 16, the method further comprising:
    receiving an indication of the validity period of the previously received PWS message from the cellular base station,
    wherein the indication of the validity period of the previously received PWS message is either:
        provided separately from the system information comprising the PWS message;
        provided in system information scheduling information provided in a system information block broadcast by the cellular base station; or
        provided in paging information provided during each paging occasion of the validity period of the previously received PWS message.

* * * * *